United States Patent
Li et al.

(10) Patent No.: US 12,529,773 B2
(45) Date of Patent: *Jan. 20, 2026

(54) COMPENSATION CIRCUITRY FOR LiDAR RECEIVER SYSTEMS AND METHOD OF USE THEREOF

(71) Applicant: Innovusion, Inc., Sunnyvale, CA (US)

(72) Inventors: Yufeng Li, Milpitas, CA (US); Yimin Li, Cupertino, CA (US); Rui Zhang, Palo Alto, CA (US); Junwei Bao, Los Altos, CA (US); Jim Li, Milpitas, CA (US)

(73) Assignee: SEYOND, INC., Sunnyvale, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/376,426

(22) Filed: Oct. 3, 2023

(65) Prior Publication Data
US 2024/0027593 A1 Jan. 25, 2024

Related U.S. Application Data

(63) Continuation of application No. 16/379,207, filed on Apr. 9, 2019, now Pat. No. 11,789,132.

(60) Provisional application No. 62/654,913, filed on Apr. 9, 2018.

(51) Int. Cl.
G01S 7/497 (2006.01)
G01S 7/481 (2006.01)
G01S 7/484 (2006.01)
G01S 7/4861 (2020.01)

(52) U.S. Cl.
CPC ............ *G01S 7/497* (2013.01); *G01S 7/4816* (2013.01); *G01S 7/484* (2013.01); *G01S 7/4861* (2013.01); *G01S 7/4817* (2013.01)

(58) Field of Classification Search
CPC ...... G01S 7/4816; G01S 7/4817; G01S 7/484; G01S 7/486; G01S 7/4861; G01S 7/487; G01S 7/497; G01S 7/4868; G01J 2001/446; G01J 2001/4466; H01L 31/107; H10F 30/225
See application file for complete search history.

(56) References Cited

U.S. PATENT DOCUMENTS

| | | |
|---|---|---|
| 3,897,150 A | 7/1975 | Bridges et al. |
| 4,464,048 A | 8/1984 | Farlow |
| 5,006,721 A | 4/1991 | Cameron et al. |

(Continued)

FOREIGN PATENT DOCUMENTS

| | | |
|---|---|---|
| CN | 1677050 A | 10/2005 |
| CN | 204758260 U | 11/2015 |

(Continued)

OTHER PUBLICATIONS

Machine translation of JP-2004215274-A (Year: 2014).*

(Continued)

*Primary Examiner* — Yuqing Xiao
*Assistant Examiner* — Zhengqing Qi
(74) *Attorney, Agent, or Firm* — MASCHOFF BRENNAN; Ran Pang; Liang Huang

(57) ABSTRACT

Embodiments discussed herein refer to LiDAR systems that use avalanche photo diodes for detecting returns of laser pulses. The bias voltage applied to the avalanche photo diode is adjusted to ensure that it operates at desired operating capacity.

21 Claims, 14 Drawing Sheets

(56) References Cited

U.S. PATENT DOCUMENTS

| | | |
|---|---|---|
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,638,163 A | 6/1997 | Nourrcier, Jr. |
| 5,657,077 A | 8/1997 | DeAngelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,929,982 A * | 7/1999 | Anderson ............ H03G 1/0047 356/73.1 |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,852,966 B1 * | 2/2005 | Douma .............. H04B 10/6911 250/214 AG |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,984,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,203 B1 | 4/2016 | Droz et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,175,405 B2 | 11/2021 | Pacala et al. |
| 11,178,381 B2 | 11/2021 | Pacala et al. |
| 11,190,750 B2 | 11/2021 | Pacala et al. |
| 11,194,048 B1 | 12/2021 | Burbank et al. |
| 11,287,515 B2 | 3/2022 | Pacala et al. |
| 11,422,236 B2 | 8/2022 | Pacala et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0138092 A1 * | 6/2008 | Nagakubo .......... H04B 10/6911 398/202 |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2010/0301194 A1 | 12/2010 | Patel et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |

(56) References Cited

U.S. PATENT DOCUMENTS

| | | |
|---|---|---|
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0231630 A1 | 8/2014 | Rae et al. |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | McCloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0273959 A1* | 9/2016 | Wang ............... H10F 77/959 |
| 2016/0282451 A1* | 9/2016 | Hartman ............ G01S 17/10 |
| 2016/0291134 A1 | 10/2016 | Droz et al. |
| 2016/0313446 A1 | 10/2016 | Bailey et al. |
| 2016/0327646 A1 | 11/2016 | Scheim et al. |
| 2017/0003116 A1 | 1/2017 | Yee et al. |
| 2017/0122804 A1 | 5/2017 | Cao et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1* | 10/2017 | Schwarz ............ G01S 7/4812 |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0146027 A1 | 5/2019 | McLaughlin, II |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310354 A1 | 10/2019 | Li et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | | |
|---|---|---|---|
| CN | 204885804 U | 12/2015 | |
| CN | 108132472 A | 6/2018 | |
| CN | 207457508 U | 6/2018 | |
| CN | 207557465 U | 6/2018 | |
| CN | 208314210 U | 1/2019 | |
| CN | 208421228 U | 1/2019 | |
| CN | 208705506 U | 4/2019 | |
| CN | 106597471 B | 5/2019 | |
| CN | 209280923 U | 8/2019 | |
| CN | 108445468 B | 11/2019 | |
| CN | 110031823 B | 3/2020 | |
| CN | 108089201 B | 4/2020 | |
| CN | 109116331 B | 4/2020 | |
| CN | 109917408 B | 4/2020 | |
| CN | 109116366 B | 5/2020 | |
| CN | 109116367 B | 5/2020 | |
| CN | 110031822 B | 5/2020 | |
| CN | 211655309 U | 10/2020 | |
| CN | 109188397 B | 11/2020 | |
| CN | 109814086 B | 11/2020 | |
| CN | 109917348 B | 11/2020 | |
| CN | 110492856 B | 11/2020 | |
| CN | 110736975 B | 11/2020 | |
| CN | 109725320 B | 12/2020 | |
| CN | 110780284 B | 12/2020 | |
| CN | 110780283 B | 1/2021 | |
| CN | 110784220 B | 2/2021 | |
| CN | 212623082 U | 2/2021 | |
| CN | 110492349 B | 3/2021 | |
| CN | 109950784 B | 5/2021 | |
| CN | 213182011 U | 5/2021 | |
| CN | 213750313 U | 7/2021 | |
| CN | 214151038 U | 9/2021 | |
| CN | 109814082 B | 10/2021 | |
| CN | 113491043 A | 10/2021 | |
| CN | 214795200 U | 11/2021 | |
| CN | 214795206 U | 11/2021 | |
| CN | 214895784 U | 11/2021 | |
| CN | 214895810 U | 11/2021 | |
| CN | 215641808 U | 1/2022 | |
| CN | 112639527 B | 2/2022 | |
| CN | 215932142 U | 3/2022 | |
| CN | 112578396 B | 4/2022 | |
| EP | 0 757 257 A2 | 2/1997 | |
| EP | 1 237 305 A2 | 9/2002 | |
| EP | 1 923 721 A1 | 5/2008 | |
| EP | 2 157 445 A2 | 2/2010 | |
| EP | 2 395 368 A1 | 12/2011 | |
| EP | 2 889 642 A1 | 7/2015 | |
| GB | 1 427 164 A | 3/1976 | |
| GB | 2 000 411 A | 1/1979 | |
| JP | 2004215274 A * | 7/2004 | ....... H01L 31/02027 |
| JP | 2007144667 A | 6/2007 | |
| JP | 2010035385 A | 2/2010 | |
| JP | 2017003347 A | 1/2017 | |
| JP | 2017138301 A | 8/2017 | |
| KR | 10-2012-0013515 A | 2/2012 | |
| KR | 10-2013-0068224 A | 6/2013 | |
| KR | 10-2018-0107673 A | 10/2018 | |
| WO | 2017/110417 A1 | 6/2017 | |
| WO | 2018/125725 A1 | 7/2018 | |
| WO | 2018/129408 A1 | 7/2018 | |
| WO | 2018/129409 A1 | 7/2018 | |
| WO | 2018/129410 A1 | 7/2018 | |
| WO | 2018/175990 A1 | 9/2018 | |
| WO | 2018/182812 A2 | 10/2018 | |

(56) References Cited

FOREIGN PATENT DOCUMENTS

| WO | 2019/079642 A1 | 4/2019 |
|---|---|---|
| WO | 2019/165095 A1 | 8/2019 |
| WO | 2019/165289 A1 | 8/2019 |
| WO | 2019/165294 A1 | 8/2019 |
| WO | 2020/013890 A2 | 1/2020 |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

European Search Report, dated Jul. 17, 2020, for EP Application No. 18776977.3, 12 pages.

European Search Report, dated Jun. 17, 2021, for EP Application No. 18868896.4, 7 pages.

Extended European Search Report, dated Jul. 10, 2020, for EP Application No. 18736738.8, 9 pages.

Extended European Search Report, dated Jul. 22, 2020, for EP Application No. 18736685.1, 10 pages.

Fiber laser, Wikipedia, https://en.wikipedia.org/wiki/Fiber_laser, 6 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jan. 3, 2019, for International Application No. PCT/US2018/056577, 15 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Mirrors, Physics LibreTexts, https://phys.libretexts.org/Bookshelves/Optics/Supplemental_Modules_(Components)/Mirrors, (2021), 2 pages.

Office Action Issued in Japanese Patent Application No. 2019-536019 dated Nov. 30, 2021, 6 pages.

"Why Wavelengths Matter in Fiber Optics", FirstLight, https://www.firstlight.net/why-wavelengths-matter-in-fiber-optics/, (2021), 5 pages.

International Search Report and Written Opinion, dated Jul. 24, 2019, for International Application No. PCT/US2019/026547, 12 pages.

Xinxin Zhou, et al., "Thin Al1—xGaxAs0.56Sb0.44 diodes with extremely weak temperature dependence of avalanche breakdown" Royal Society Open Science, vol. 4, No. 5, May 1, 2017 (May 1, 2017), p. 170071.

Jingjing Xie et al., "An InGaAs/AlAsSb Avalanche Photodiode with a Small Temperature Coefficient of Breakdown" IEEE Photonics Journal, IEEE, USA, vol. 5, No. 4, Aug. 1, 2013 (Aug. 1, 2013), p. 6800706.

\* cited by examiner

COMPENSATION CIRCUITRY FOR LiDAR RECEIVER SYSTEMS AND METHOD OF USE THEREOF

CROSS-REFERENCE TO A RELATED APPLICATION

This application is a continuation of U.S. patent application Ser. No. 16/379,207, filed Apr. 9, 2019, which claims the benefit of U.S. Provisional Application No. 62/654,913, filed Apr. 9, 2018. The entire contents of these applications are hereby incorporated herein by reference.

FIELD OF THE INVENTION

The present disclosure relates to light detection and ranging (LiDAR), and in particular to LiDAR systems and methods for use in a vehicle.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Conventional LiDAR systems can use fiber optic lasers or diode lasers as the light source. Both light sources have their advantages and disadvantages.

BRIEF SUMMARY

Embodiments discussed herein refer to LiDAR systems that use avalanche photo diodes for detecting returns of laser pulses. The bias voltage applied to the avalanche photo diode is adjusted to ensure that it operates at a desired operating capacity.

In one embodiment, a LiDAR system is provided that can include a scanning system that includes an avalanche photo diode (APD) having first and second terminals, the APD having an avalanche voltage threshold, wherein the avalanche voltage threshold is temperature dependent; a variable voltage source coupled to the first terminal, the variable voltage source operative to apply a bias voltage to the first terminal; an amplifier coupled to the second terminal; and a controller coupled to the variable voltage source and operative to adjust a magnitude of the bias voltage applied to the first terminal to ensure that the applied bias voltage does not exceed the avalanche voltage threshold.

In one embodiment, a method for using a LiDAR system that includes an avalanche photo diode (APD), a variable voltage source, and a temperature sensor, is provided. The method can include receiving a temperature value from the temperature sensor, determining a bias voltage to be applied to the APD based on the received temperature such that the applied bias voltage does not exceed an avalanche voltage threshold of the APD, and controlling the variable voltage source to apply the determined bias voltage to the APD.

In another embodiment, a method for using a LiDAR system that includes an avalanche photo diode (APD), a variable voltage source, and an amplifier, is provided. The method can include conducting a bias voltage calibration that instructs the variable voltage source to sweep through a plurality of applied bias voltages; monitor an output of the amplifier during the bias voltage calibration sweep; determining an avalanche threshold voltage of the APD based on the monitored output; and setting the applied bias voltage, via the variable voltage source, to an optimal applied bias voltage based on the determined avalanche voltage, wherein the optimal applied bias voltage is less than the determined avalanche voltage.

In one embodiment, a method for using a LiDAR system including an avalanche photo diode (APD), a temperature sensor, and a variable voltage source, is provided. The method can include determining a physical breakdown voltage of the APD, generating an anticipated avalanche voltage threshold based, at least in part, on the determined physical breakdown voltage, determining an initial bias voltage based on the anticipated avalanche voltage threshold and a voltage offset, and determining an active scanning event bias voltage based on the initial bias voltage and a temperature received by the temperature sensor, wherein the active scanning event bias voltage is applied to the avalanche photodiode by the variable voltage source to prevent the avalanche photodiode from operating at or above the anticipated avalanche voltage threshold.

In one embodiment, a LiDAR system is provided that includes an avalanche photo diode (APD), a temperature sensor, a variable voltage source, and a controller operative to determine a physical breakdown voltage of the APD; generate an anticipated avalanche voltage threshold based, at least in part, on the physical breakdown voltage; determine an initial bias voltage based on the anticipated avalanche voltage threshold and a voltage offset; and determine an active scanning event bias voltage based on the initial bias voltage and a temperature received by the temperature sensor, wherein the active scanning event bias voltage is applied to the avalanche photodiode by the variable voltage source to prevent the avalanche photodiode from operating at or above the anticipated avalanche voltage threshold.

In yet another embodiment, a method for using a LiDAR that includes an avalanche photo diode (APD) is provided. The method can include transmitting a light pulse each light pulse period; and dynamically sweeping through a predefined range of bias voltages that are applied to the APD during each light pulse period.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
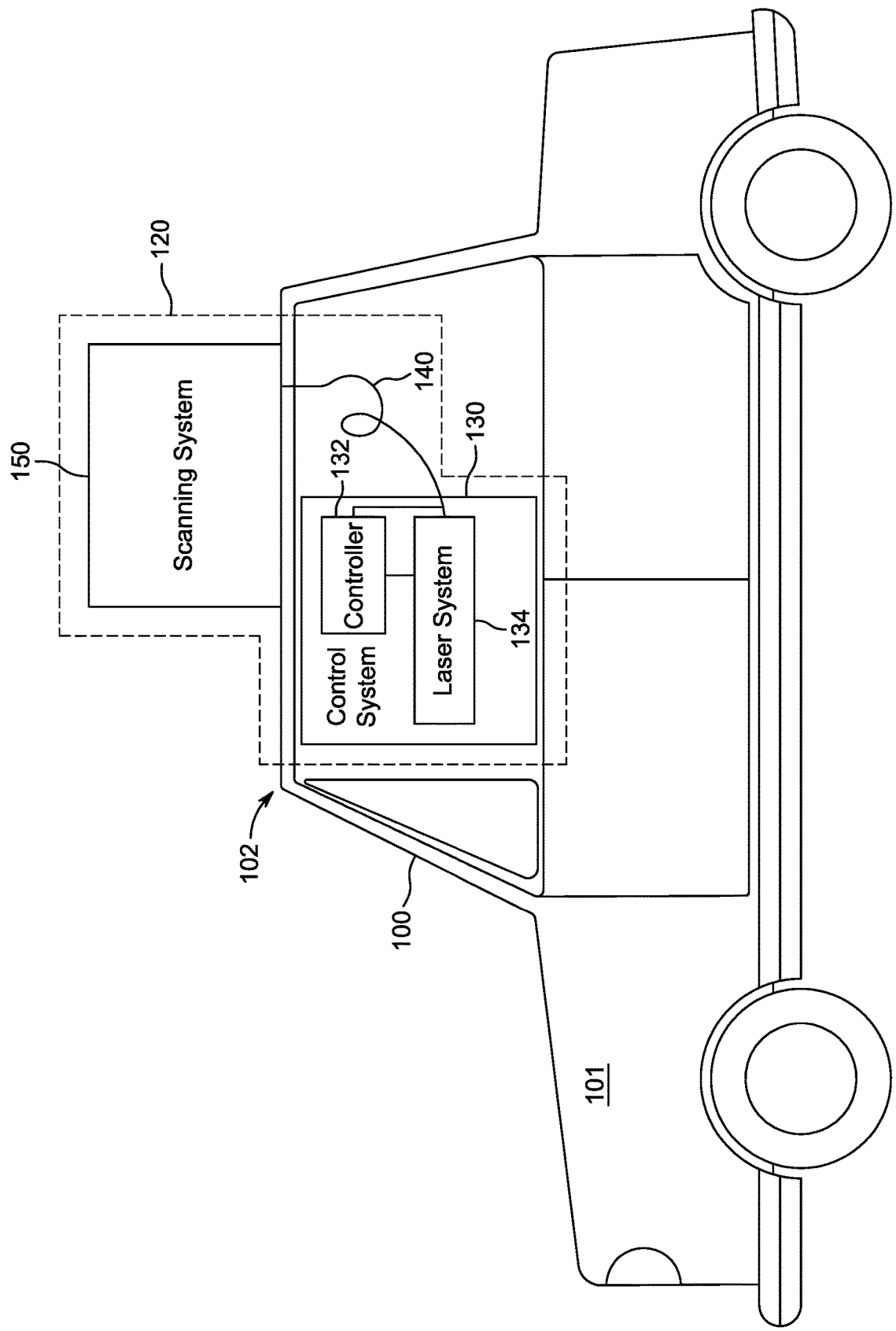
FIG. 1 shows an illustrative vehicle having a LiDAR system that is attached to and/or incorporated therein, according to an embodiment.

FIG. 1 shows an illustrative vehicle 100 having a LiDAR system 120 that is attached to and/or incorporated therein according to an embodiment. Vehicle 100 can be generically classified as having interior portion 101 and exterior portion 102. Interior portion 101 may be portions of vehicle 100 that are not directly exposed to external environmental factors such as the environment conditions (e.g., water, humidity, sun, ice, wind, etc.) and road conditions (e.g., road debris). Interior portion 101 may be influenced by external environment conditions but to a lesser degree than exterior portion 102. LiDAR system 120 may include, among other features, control system 130, cable system 140, and scanning system 150. Control system 130 may be contained within interior portion 101, scanning system 150 may be mounted to exterior portion 102, and cable system 140 may exist solely within interior portion 101 or can exist as part of interior portion 101 and exterior portion 102. This arrangement is illustrative and in some embodiments, control system 130 or portions thereof (e.g., laser system 134) can be mounted to exterior portion 102.

Control system 130 can include controller 132 and laser system 134. Controller 132 and laser system 134 may be coupled to scanning system 150 via cable system 140. Laser system 134 may transmit light pulses through cable system 140 to scanning system 150. Laser system 134 may use diode lasers to generate light pulses or fiber lasers. Controller 132 may control a current source at which laser system 134 transmits its light pulses. Controller 132 may receive detector signals from scanning system 150 via cable system 140. The detector signals may be the return or consequence signals that are detected by one or more detectors when the transmitted light pulses bounce of an object being observed by scanning system 150. Scanning system 150 may include the appropriate lenses, mirrors, steering optics, and detectors needed to capture an image of a scene existing within a vicinity of vehicle 100.

In some embodiments, LiDAR system 120 can separate laser system 134 and scanning system 150 from each other such that laser system 134 is contained within interior portion 101. Keeping laser system 134 (and other components associated with control system 130) within interior portion 101 provides an environment that is less harsh than that of exterior portion 102. This provides cooling advantages over containing laser system 134 as part of scanning system 150, which is located on exterior portion 102. Laser system 134 can use diode lasers or fiber lasers, and the light pulses are transmitted through cable system 140 to scanning system 150. Cable system 140 can include one or more fiber optic cables for transmitting light pulses from laser system 134 to scanning system 150. Cable system 140 can include one or more electrical conduits for transferring electrical signals between control system 130 and scanning system 150. For example, control system 130 may provide instructions to scanning system 150 to control steering optics. As another example, scanning system 150 may provide detection signals to controller 132 via cable system 140.

Figure 2:
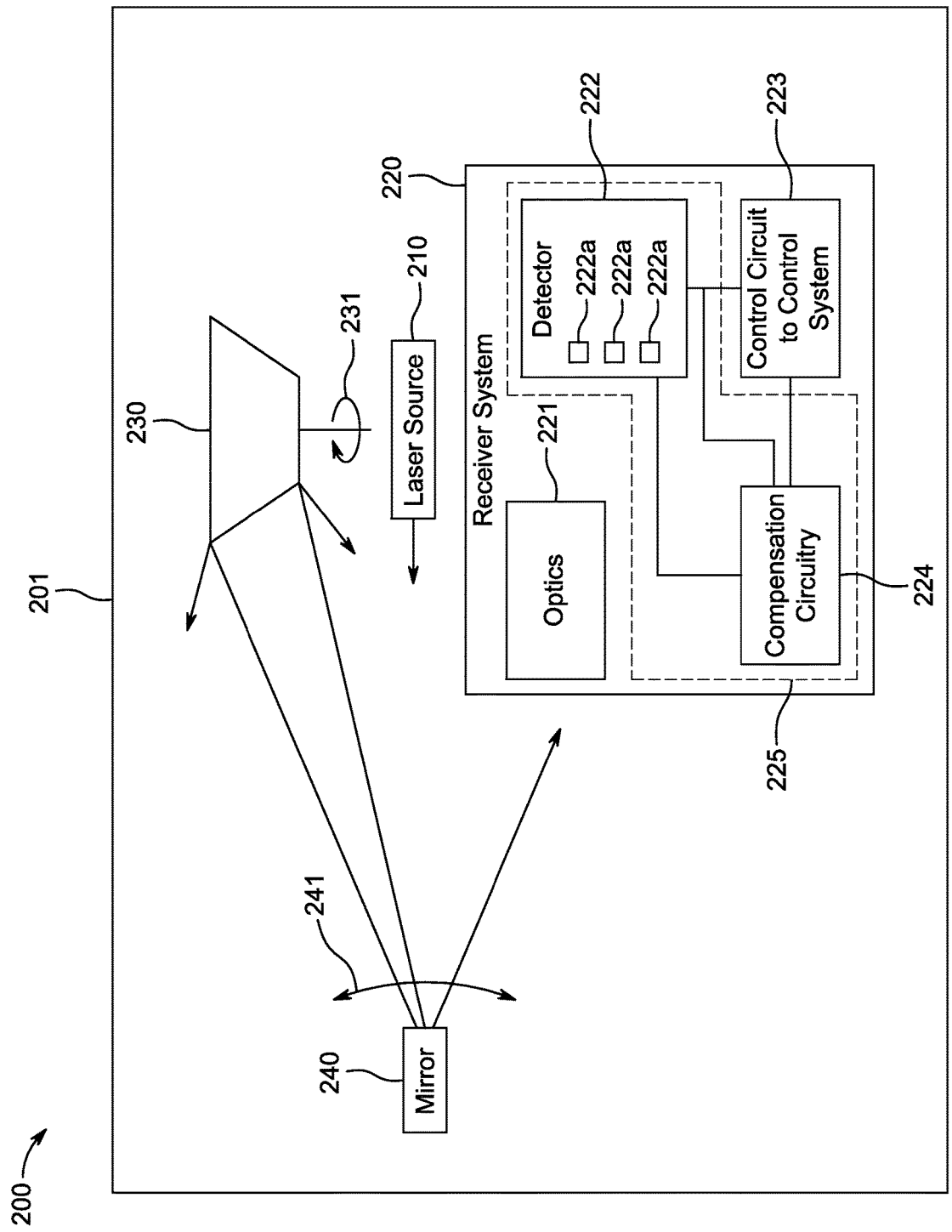
FIG. 2 shows an illustrative scanning system according to an embodiment.

FIG. 2 shows illustrative scanning system 200 according to an embodiment. Scanning system 200 can include housing 201, laser source 210, receiver system 220, polygon structure 230, and mirror 240. Housing 201 is constructed to house laser source 210, receiver system 220, polygon structure 230, and mirror 240.

Laser source 210 may be operative to direct light energy towards mirror 240 and receiver system 220 is operative to receive reflected light energy from mirror 240. Mirror 240 is operative to redirect light energy transmitted from laser source 210 to polygon structure 230. Mirror 240 is also operative to redirect light energy received from polygon structure 230 to receiver system 220. Mirror 240 may be moved in the directions shown by arrow 241. As mirror 240 oscillates back and forth, it causes light being transmitted by laser system 210 to interface with different portions of polygon structure 230. During operation of system 200, light energy is emitted by laser source 210 towards mirror 240, which redirects the light to polygon structure 230, which redirects the light energy out of housing 201. The light energy being directed by polygon structure 230 is cast in accordance with the field of view parameters of scanning system 200. That is, if system 200 has a field of view with range of x, a lateral angle of y, and vertical angle of z, the range x can be controlled by the power of transmitter system 210, the vertical angle z can be controlled by the movement of mirror 240, and the lateral angle y can be controlled by polygon structure 230. Light energy that is reflected back from objects in the field of view and returns to polygon structure 230 where it is directed back to mirror 240, which redirects it back to receiver system 220.

Polygon structure 230 may be constructed from a metal such as aluminum, plastic, or other material that can have a polished or mirrored surface. Polygon structure 230 may be selectively masked to control the lateral dispersion of light energy being projected in accordance with the field of view of scanning system 200. Polygon structure 230 can include a number of facets to accommodate a desired horizontal field of view (FOV). The facets can be parallel or non-parallel to its symmetric axis. Polygon structure 230 is operative to spin about axis 231 in a first direction at a substantially constant speed. Axis 231 can be coincident to the symmetrical axis of structure 230 or it can be tilted at an angle with respect to the symmetrical axis of structure 230, which can effectively increase resolution in vertical angle of z. The shape of polygon structure 230 can be trimmed (e.g., chop off the sharp corner or tip to reduce overall weight, chamfer the sharp edge to reduce air resistance) for better operation performance. Polygon structure 230 may sometime be referred to herein as a mirror.

Mirror 240 may be a single plane or multi-plane mirror that oscillates back and forth to redirect light energy emitted by laser source 210 to polygon 230. The single plane mirror may provide higher resolutions at the top and bottom portions of the vertical field of view than the middle portion, whereas the multi-plane mirror may provide higher resolution at a middle portion of the vertical field of view than the top and bottom portions.

Receiver system 220 can include optics 221, detector 222, control circuitry 223, and compensation circuitry 224. Optics 221 may contain light-transmitting optics that gather laser light returned from mirror 240. Detection sub-assembly 225 may include detector array 222 and compensation circuitry 224. Detector array 222 may contain one or more detectors 222a that generate voltage signals when exposed to light energy through optics 221. Detectors 222a may be, for example, avalanche photo diodes. Compensation circuitry 224 may include electrical circuitry operative to modify operational characteristics of detectors 222a to ensure optimal performance. For example, compensation circuitry 224 may monitor and control avalanche photo diode bias voltage. As shown, compensation circuitry 224 can be connected to detector array 222 (e.g., to the anode and cathode of each detector 222a) and to control circuitry 223. The outputs of detectors 222a can be processed by control circuitry 223 and delivered to a control system (e.g., control system 130) to enable processing of return pulses (not shown).

Figure 3:
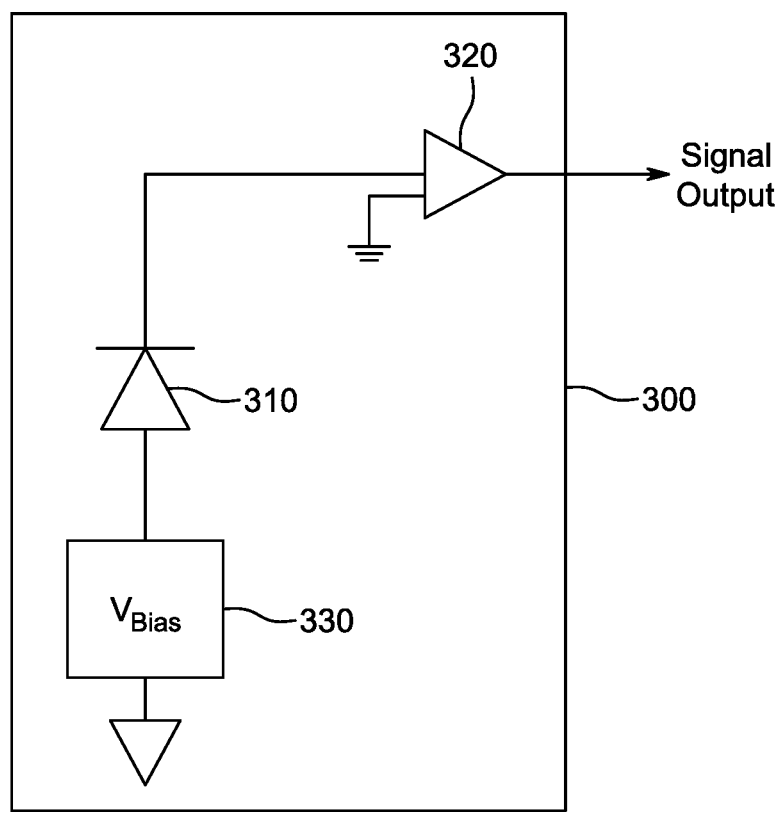
FIG. 3 shows an illustrative compensation circuit diagram, according to an embodiment.

FIG. 3 shows an illustrative circuit 300 having an avalanche photo diode for use in a LiDAR signal control system according to an embodiment. Circuit 300 may represent circuitry that may be found in detectors 222. Circuit 300 may contain avalanche photo diode 310 and amplifier 320. Bias voltage 330 may be applied to a first terminal of diode 310 and amplifier may be coupled to a second terminal of diode 310. Bias voltage 330 may be used to bias an avalanche threshold of diode 310. Amplifier 320 may amplify the output of diode 310.

Avalanche photo diodes have a breakdown voltage and an avalanche voltage. The breakdown voltage is not noise based and represents the voltage level where the diode avalanches. The avalanche voltage represents the voltage or range of voltages where the noise being generated within the gain medium of the diode starts to grow and eventually grows to the point out where it amplifies itself, thereby causing the avalanche. The avalanche photo diode can experience avalanche effects at voltage levels below the breakdown voltage. These avalanche effects can be represented by the amount of noise that is being produced by the diode. Because the amount of noise can grow exponentially as a function of voltage, it is desirable to operate the avalanche photodiode at a voltage level before the noise becomes too great for the LiDAR system to handle.

Figure 4:
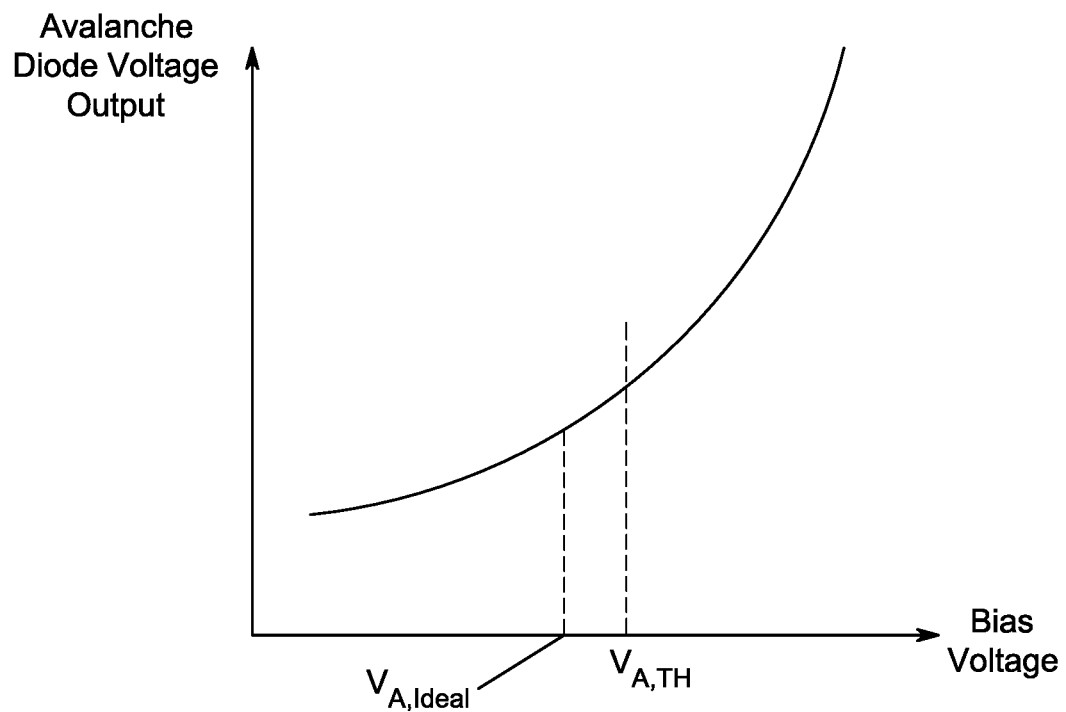
FIG. 4 shows an illustrative plot of avalanche photo diode voltage output vs. bias voltage, according to an embodiment.

FIG. 4 shows an illustrative plot of voltage gain produced by an avalanche photo diode with respect to diode bias voltage according to an embodiment. High avalanche photo diode voltage gain may be desirable for data analysis. As bias voltage increases, avalanche photo diode voltage gain may increase non-linearly. Voltage $V_{A,TH}$ represents the avalanche threshold of the avalanche photo diode. When the bias voltage is equal to or greater than $V_{A,TH}$, the noise based avalanche effect can spontaneously take place. The avalanche effect can result in excessive noise and the signal to noise ratio from output of the photo diode may become undesirable. $V_{A,IDEAL}$ may represent an optimal bias voltage for operating the avalanche photo diode. $V_{A,IDEAL}$ is slightly lower than $V_{A,TH}$ and is selected to maximize avalanche photo diode voltage gain while minimizing noise amplification. Not shown in FIG. 4 is the breakdown voltage.

Figure 5:
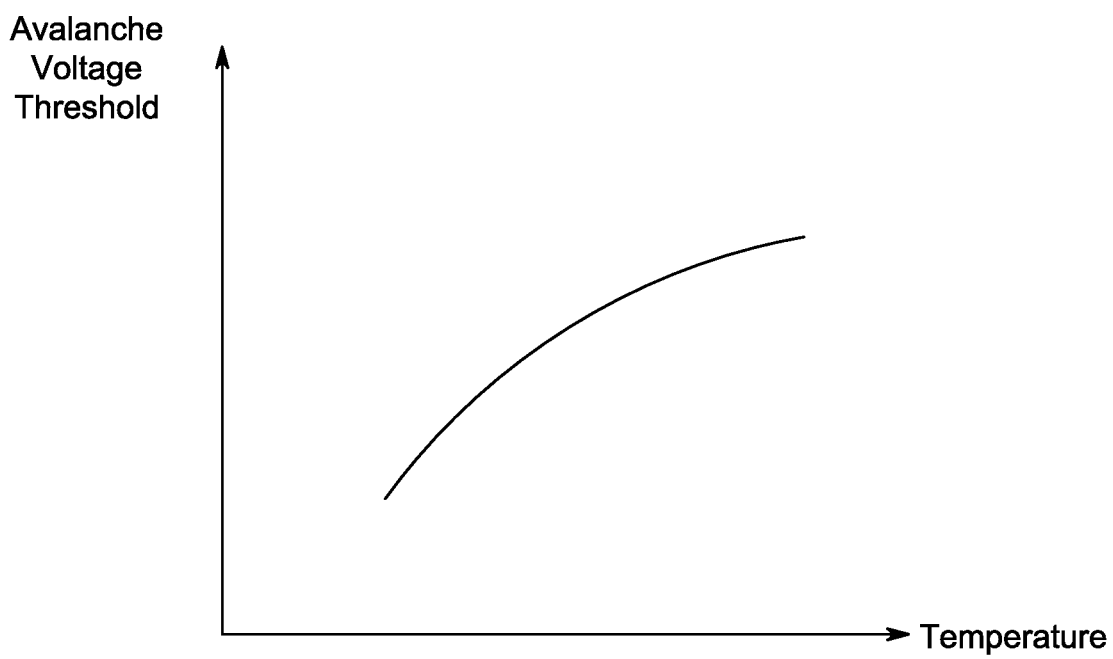
FIG. 5 shows an illustrative plot of avalanche photo diode avalanche threshold vs. temperature, according to an embodiment.

FIG. 5 shows a plot of avalanche voltage threshold as a function of temperature for an avalanche photo diode according to an embodiment. Since a LiDAR system such as LiDAR system 120 operates in various and dynamic environmental conditions that may include temperature fluctuations, the avalanche voltage of the system might change over time due to temperature fluctuations. Embodiments discussed herein are able to dynamically adjust the bias voltage by taking temperature into account.

Figure 5A:
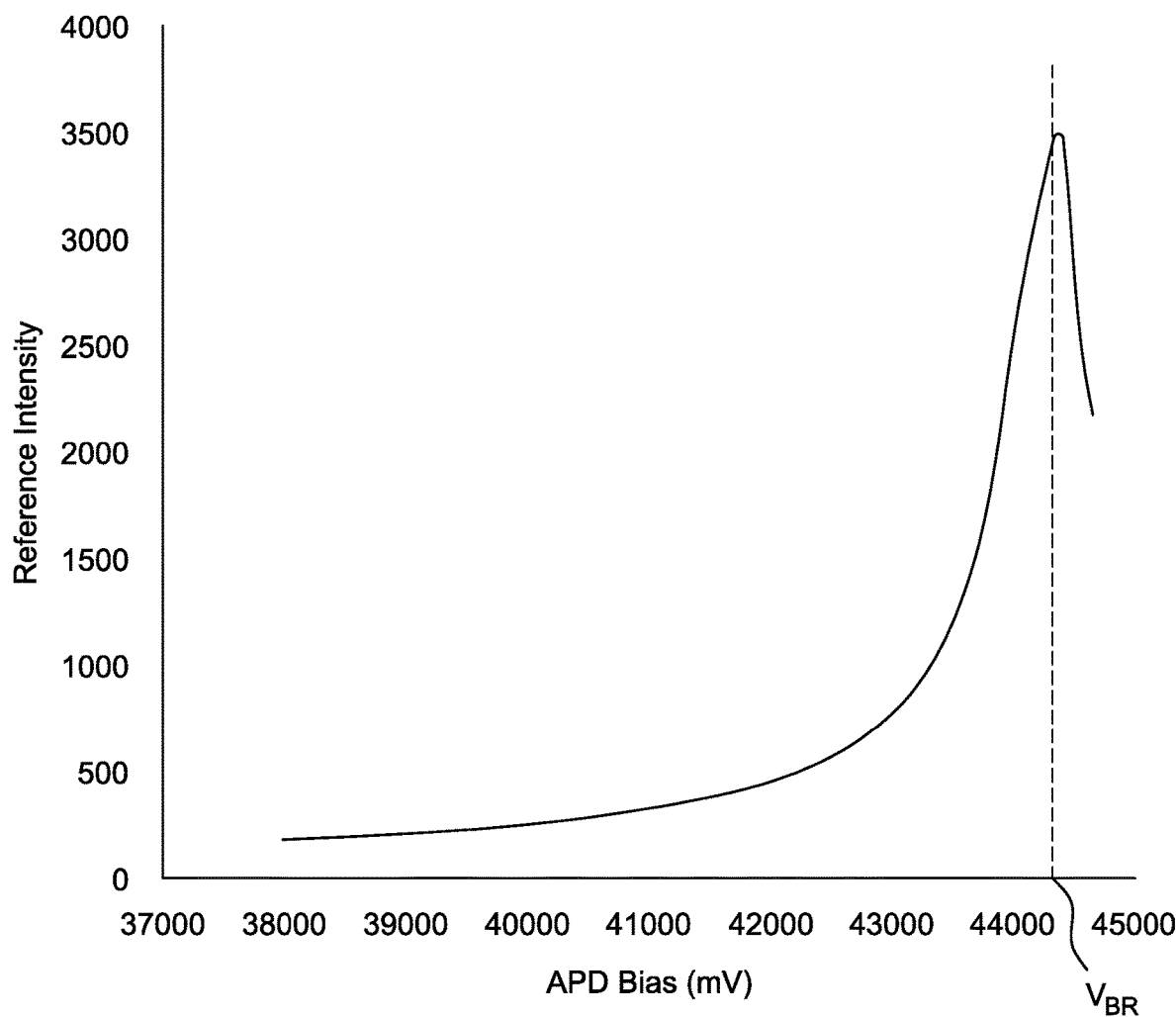
FIG. 5A shows an illustrative plot of signal intensity as a function of bias voltage according to an embodiment.
Figure 5B:
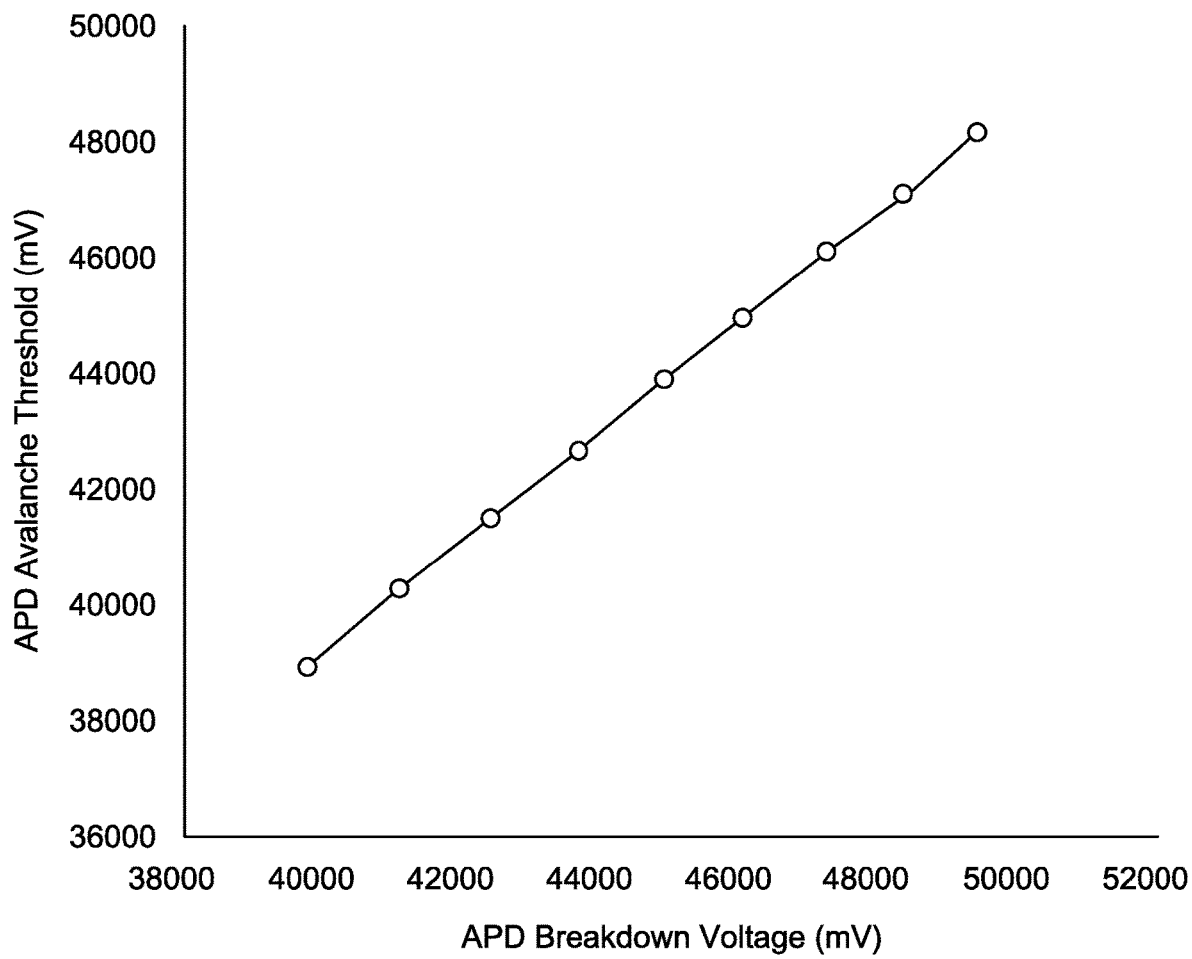
FIG. 5B shows an illustrative plot of the avalanche voltage threshold as a function of APD breakdown voltage according to an embodiment.

FIG. 5A shows an illustrative plot of signal intensity as a function of bias voltage according to an embodiment. Signal intensity refers to the output of the avalanche photo diode. Using appropriate physical models, the breakdown voltage of the APD device, $V_{BR}$, can be obtained through curve fitting, even though the signal is strongly saturated when the bias voltage reaches $V_{BR}$. FIG. 5B shows an illustrative plot of the relationship between the physical breakdown voltage and the avalanche voltage threshold at different temperatures for certain APD devices. It is clear that for some APD devices, a simple linear formula can be used to predict the avalanche voltage threshold based on the measured breakdown voltage. For other APD devices, the relationship between the physical breakdown voltage and the avalanche voltage threshold may not be as simple, but in general the avalanche voltage threshold can still be characterized as a function of breakdown voltage and temperature. Combining FIG. 5A and FIG. 5B, it is therefore possible to obtain the APD breakdown voltage at any temperature through a bias voltage scan, and then use a pre-defined formula to predict the corresponding avalanche voltage threshold at that temperature.

Figure 6:
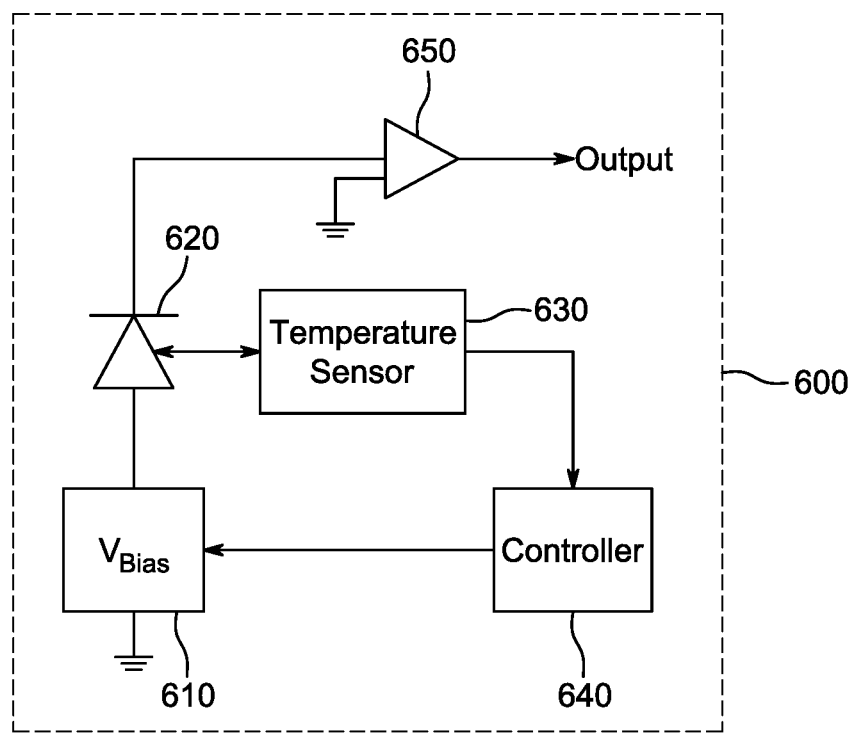
FIG. 6 shows an illustrative compensation circuit diagram, according to an embodiment.

FIG. 6 shows an illustrative bias voltage control circuit diagram according to an embodiment. Circuit 600 may contain voltage generator 610, avalanche photo diode 620, temperature sensor 630, controller 640, and amplifier 650. Circuit 600 can control the bias voltage applied to diode 620 based, at least in part, on the temperature obtained by temperature sensor 630. Temperature sensor 630 may sense the temperature of diode 620 using, for example, a thermistor that is placed adjacent to diode 620 or on a circuit board (not shown). The sensed temperature may be provided to controller 640, which may determine the ideal avalanche photo diode bias voltages for that sensed temperature and may adjust the bias voltage accordingly. In some embodiments, controller 640 can access a look up table to determine the ideal bias voltage. In another embodiment controller 640 can perform calculations based on the sensed temperature to set the bias voltage. See, for example, the description below in connection FIG. 14 for examples of calculations that may be made to determine the bias voltage. This way, regardless of the temperature associated with diode 620, controller 640 can adjust the bias voltage such that it exists at $V_{A,IDEAL}$, as indicated in FIG. 4.

Figure 7:
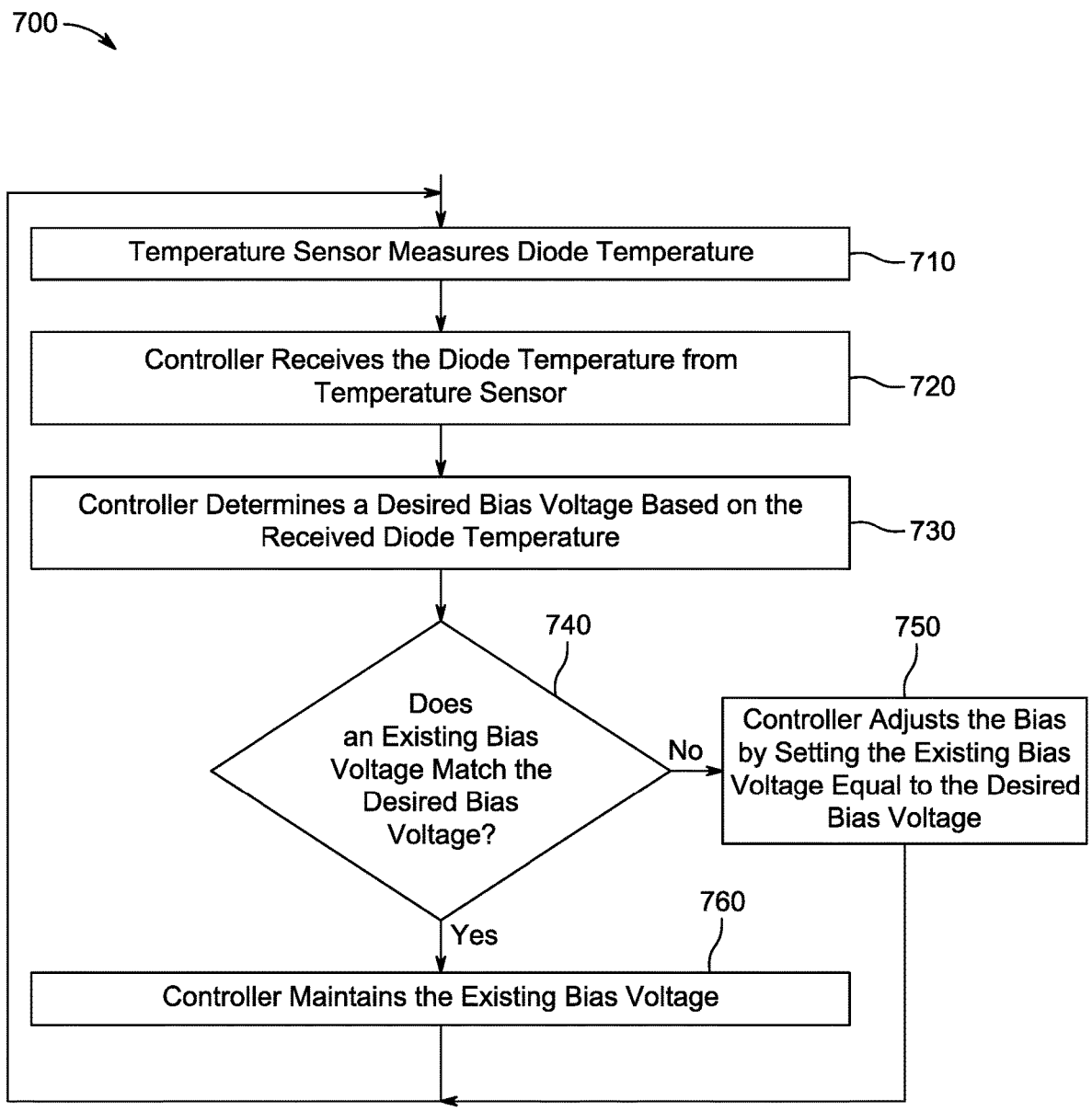
FIG. 7 shows an illustrative process, according to an embodiment.

FIG. 7 shows an illustrative process 700 according to an embodiment. Process 700 may represent the control circuit logic that may be used, for example, by circuit 600. Starting at step 710, a temperature sensor such as temperature sensor 630 records avalanche photo diode temperature. A controller (e.g., controller 640) receives the avalanche photo diode temperature as indicated by step 720. The controller then determines a desired bias voltage based, at least in part, on the temperature it receives, as indicated by step 730. In step 740, a determination is made as to whether the existing bias voltage matches a desired voltage for the measured temperature. If the determination is NO, process 700 can adjust bias voltage by setting the existing bias voltage equal to the desired voltage as indicated by step 750. If the determination is YES, process 700 can maintain the existing bias voltage as indicated by step 760.

It should be understood that the steps shown in FIG. 7 are illustrative and that the steps can be rearranged, that steps may be added, steps may be combined, or steps can be omitted.

Figure 8:
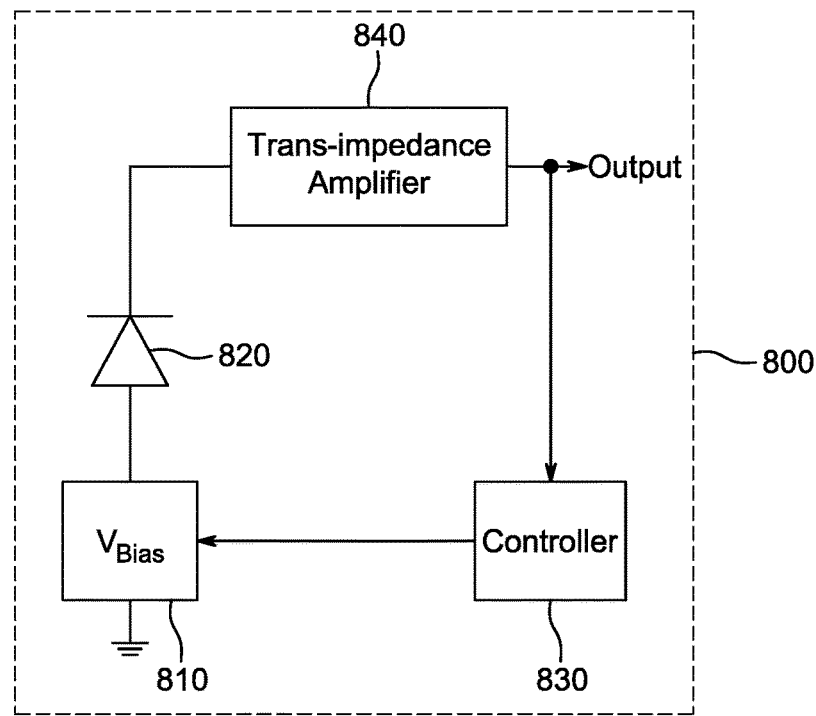
FIG. 8 shows an illustrative compensation circuit diagram, according to an embodiment.

FIG. 8 shows an illustrative bias voltage control circuit diagram, according to an embodiment. Circuit 800 may contain voltage generator 810, avalanche photo diode 820, controller 830, and amplifier 840. As the LiDAR system laser return pulses interact with an avalanche photo diode such as avalanche photo diode 820, voltage is generated and amplified. To ensure that circuit amplified diode voltage gain is adequate for data analysis, a circuit such as circuit 800 may be used to control bias voltage. In this embodiment, a controller such as controller 830 may be used to directly detect the avalanche voltage threshold of diode 820.

To determine an ideal bias voltage for the current environmental conditions, controller 830 can sweep through a predefined range of bias voltages while monitoring the output of amplifier 840. As the controller sweeps through the predefined range, it can determine the avalanche voltage threshold existing for the current set of conditions. Once the avalanche threshold is determined, an ideal bias voltage may be selected to ensure that diode 820 operates at the best bias voltage for the current set of conditions. The calibration sweep may be initiated on a time interval, at system startup, when unusual data is detected by the LiDAR control software, when a temperature sensor outside of the circuit detects temperature changes, during dead time of normal operation, or by other methods.

In some embodiments, circuit 800 may be used to determine the breakdown voltage of diode 820. The breakdown voltage may be determined as part of a LiDAR system initiation, at the start of LiDAR scanning event, or any other suitable trigger event. In some embodiments. the determination of the breakdown voltage may be used as an input in a calculation equation for determining the initial Vbias (as discussed down below in connection with FIG. 14).

Figure 9:
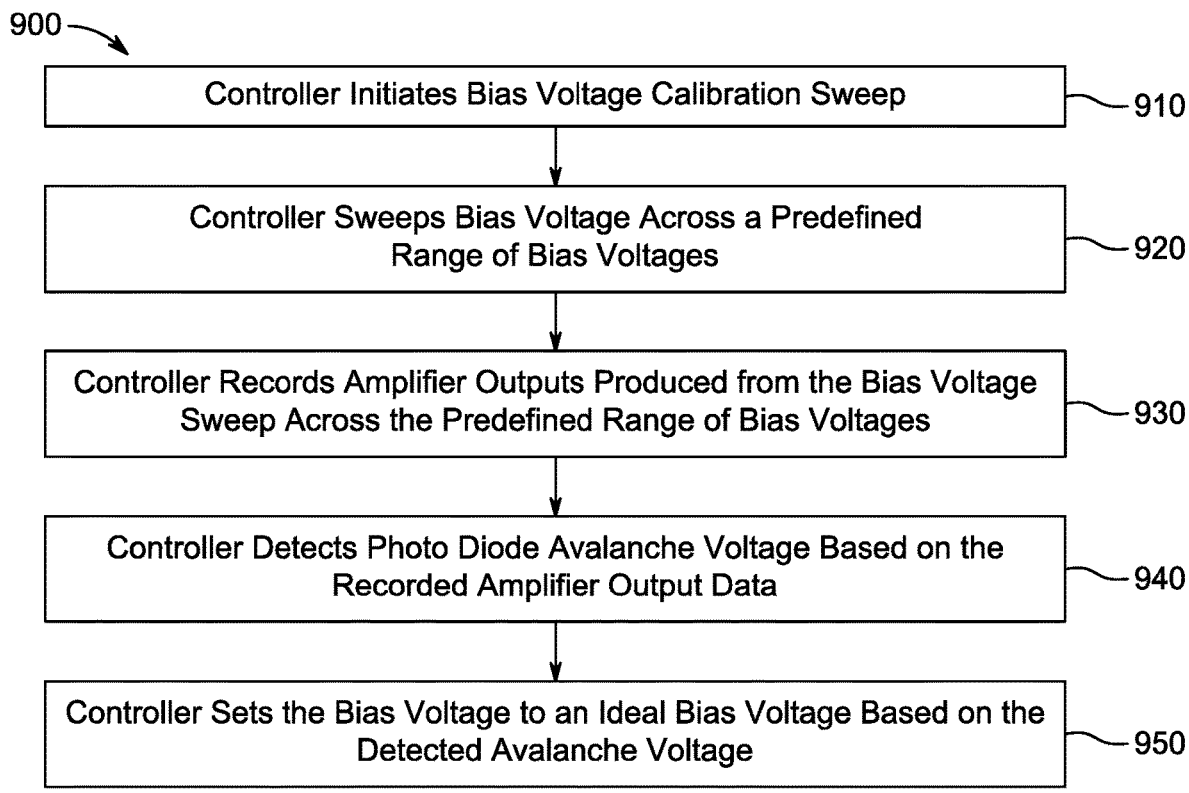
FIG. 9 shows an illustrative process, according to an embodiment.

FIG. 9 shows an illustrative process 900 according to an embodiment. Process 900 may represent the control circuit logic that may be used, for example, by circuit 800. Starting at step 910, a controller such as controller 830 initiates a bias voltage calibration sweep. The controller commands a voltage generator such as voltage generator 810 to sweep bias voltages across a predefined range of bias voltages as indicated by process 920. The controller then records amplifier output data produced by the bias voltage sweep according to step 930. In step 940, the controller detects photo diode avalanche voltage threshold or the breakdown voltage threshold based on recorded amplifier output data across the bias voltage sweep voltage range. In step 950, the controller sets the bias voltage to an ideal bias voltage based on the detected avalanche voltage. In one embodiment, the controller may determine the ideal bias voltage by applying the detected avalanche voltage or breakdown voltage to a formula. For example, the formula can subtract a fixed value from the detected avalanche voltage or the breakdown voltage threshold to yield the ideal bias voltage.

It should be understood that the steps shown in FIG. 9 are illustrative and that the steps can be rearranged, that steps may be added, steps may be combined, or steps can be omitted.

Figure 10A:
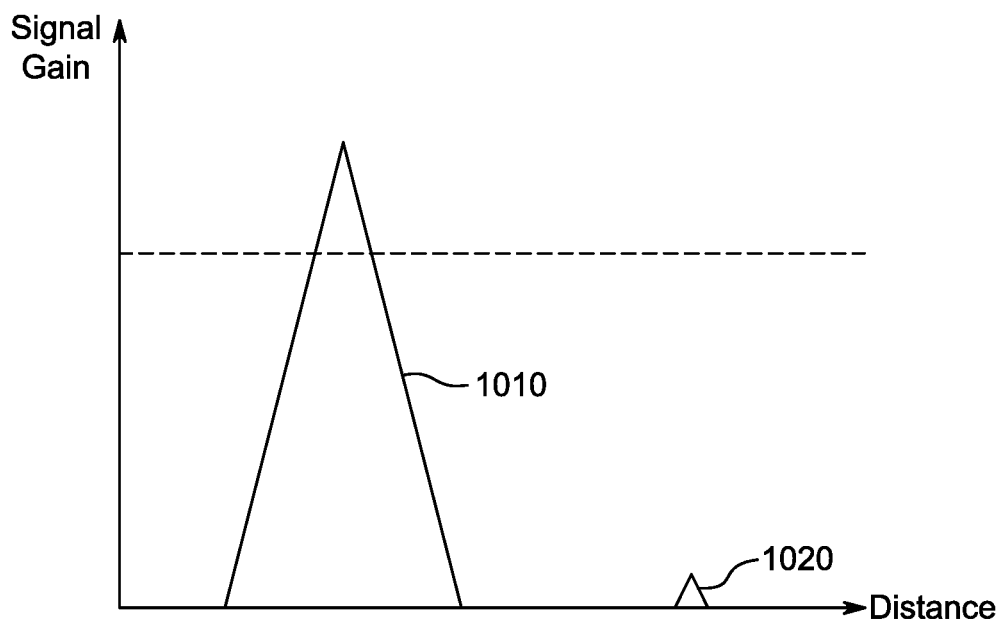
FIG. 10A shows an illustrative plot of signal gain vs. distance, according to an embodiment.
Figure 10B:
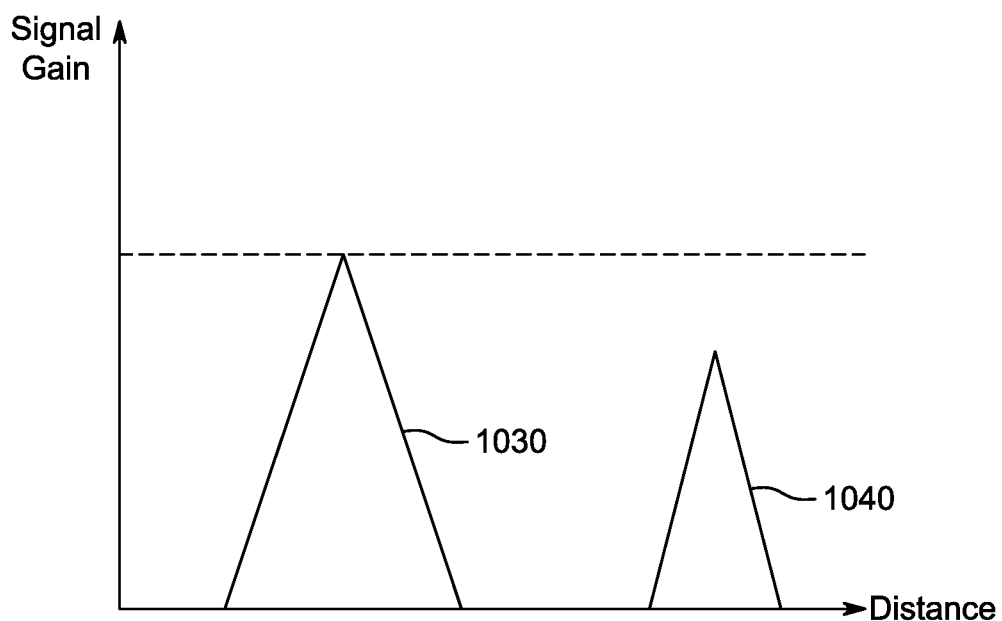
FIG. 10B shows an illustrative plot of signal gain vs. distance, according to an embodiment.

FIGS. 10A and 10B show illustrative plots of control system gain, according to an embodiment. As return laser pulses are recorded by control circuitry, an amplified signal generated by a photo diode circuit may be used by a LiDAR system to generate data on objects in the environment. For a given outgoing laser pulse, many factors may influence the intensity of laser energy returning to the system's photo diode. One of these factors may be the distance between the object and the LiDAR system. FIG. 10A shows two representative voltage gains for a single object that reflected laser light back to the LiDAR system from different distances. Pulse 1010 represents relative high signal gain response if the object is physically near the LiDAR system and pulse 1020 represents relatively low signal gain response if the object is physically far away from the LiDAR system. A potential issue with the disparity in the gain responses of pulses 1010 and 1020 is that a system may have difficulty in recognizing pulse 1020 as legitimate object return, as the gain may be too low to exceed a threshold or it may be obscured by background radiation and noise. FIG. 10B shows two representative signal gains, pulses 1030 and 1040, that correspond to the same objects corresponding to pulses 1010 and 1020 described in FIG. 10A. That is, pulse 1030 is derived from the same relatively close object as that for which pulse 1010 was derived and pulse 1040 is derived from the same relatively far object as that for which pulse 1020 was derived. The difference between FIG. 10A and FIG. 10B is that in FIG. 10B, the bias voltage may have been modulated such that the disparity in signal gains is less extreme. As a result, a relatively close object is represented by a relatively moderate signal gain response (as shown by pulse 1030) as opposed to the relatively high signal gain response of pulse 1010, and a relatively far object is also represented by a relatively moderate signal gain response (as shown by pulse 1040) as opposed to the relatively low signal gain response of pulse 1020. Pulse 1030 is greater than pulse 1040, but the disparity is not nearly as great as that shown in FIG. 10A. The bias voltage modulation feature may be important for LiDAR design considerations since extreme high or low signal gain may produce non-linear data analysis results and thus can be undesirable for data processing. If signal gain is too low, this can result in an object not being detected by the LiDAR system. If a signal gain is too high, this may result in signal saturation. Signal gains that are too low or too high may result in data being acquired in a non-linear range, thereby undesirably forcing data processing software to handle non-linear inputs.

Figure 11:
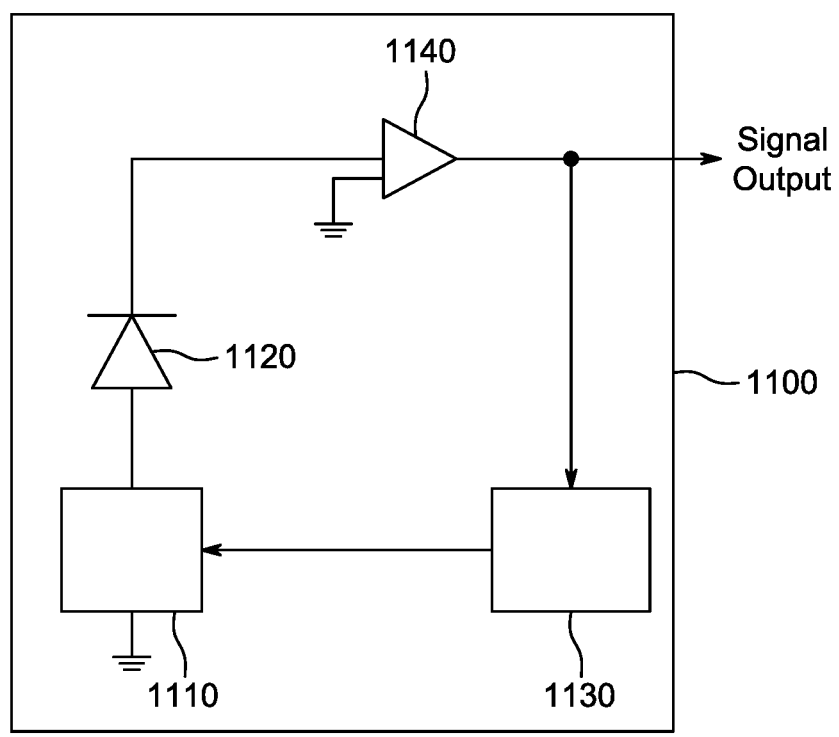
FIG. 11 shows an illustrative compensation circuit diagram, according to an embodiment.

FIG. 11 shows an illustrative bias voltage modulation control circuit diagram, according to an embodiment. Circuit 1100 may contain voltage generator 1110, photo diode 1120, controller 1130, and amplifier 1140. Return pulses interact with photo diode 1120, which produces an output in response thereto and that output is amplified by amplifier 1140. To ensure that diode 1120 produces data that is suitable for data analysis, control circuitry 1130 ensures the bias voltage remains below the avalanche voltage threshold (as discussed above) and may also modulate the bias voltage as part of a modulation feedback loop that is designed to compress relatively high gain signals and boost relatively low gain signals. Control circuitry 1130 may modulate the bias voltage to ensure that the signal gain provided by diode 1120 is within an amplitude range suitable for data processing. Control circuitry 1130 may modulate the bias voltage based on a previously received output (e.g., signal gain) of diode 1120 (which output is received via amplifier 1140). For example, if the signal gain is too high, controller 1130 may reduce the bias voltage. If the signal gain is too low, controller 1130 may increase the bias voltage. Controller 1130 may ensure that diode 1120 operates below its avalanche voltage threshold such that bias voltages can be modulated up or down to produce desired signal gains without exceeding the avalanche voltage threshold.

Figure 12:
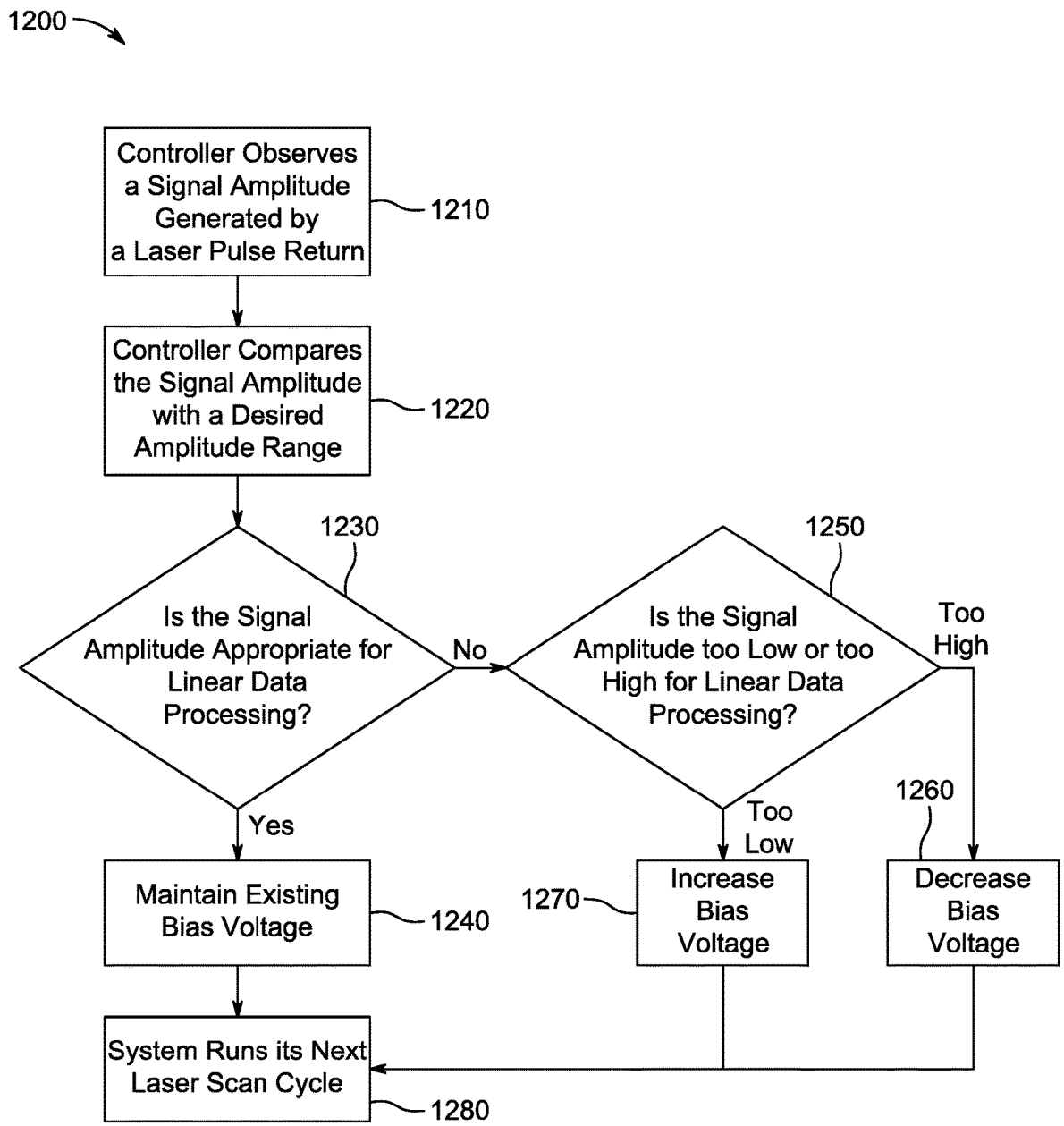
FIG. 12 shows an illustrative process, according to an embodiment.

FIG. 12 shows an illustrative process 1200 according to an embodiment. Process 1200 represents control circuit logic that may be used, for example, by circuit 1100. Starting at step 1210, a controller such as controller 1130 observes a signal amplitude generated by a LiDAR laser return pulse. The controller then compares the signal amplitude with a desired range of signal amplitudes as indicated by step 1220. In step 1230, a determination is made as to whether the signal amplitude is appropriate for linear data processing according to a pre-determined range of desired signal amplitudes. If the determination is YES, process 1200 maintains existing bias voltage as shown in step 1240. If the determination is NO, process 1200 then determines whether the signal amplitude is too low or too high, as shown in step 1250. If the determination is made that the signal amplitude is too HIGH, process 1200 then decreases bias voltage as shown in step 1260. If the determination is made that the signal amplitude is too LOW, process 1200 then increases bias voltage as shown in step 1270. Process 1200 then commands the system to run its next LiDAR system laser scan in step 1280.

It should be understood that the steps shown in FIG. 12 are illustrative and that the steps can be rearranged, that steps may be added, steps may be combined, or steps can be omitted.

Figure 13:
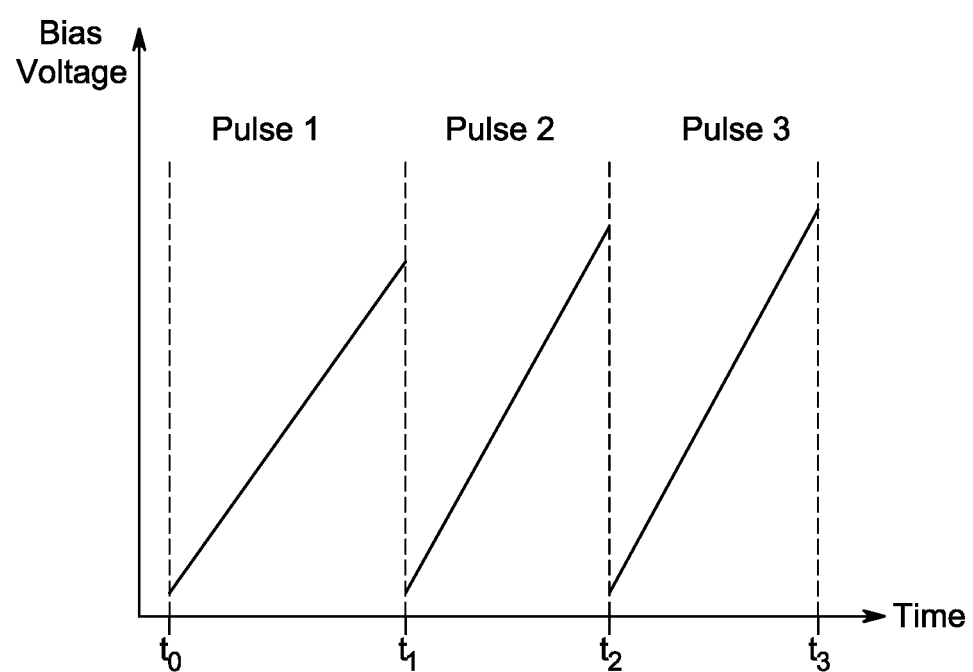
FIG. 13 shows an illustrative plot of controlled bias voltage sweeps, according to an embodiment.

FIG. 13 shows an illustrative plot of controlled bias voltage sweeps, according to an embodiment. In a circuit such as circuit 1100, excessively high or low signal gains are undesirable due to circuit component non-linearities or due to weak pulses or saturated diode output. In this embodiment, bias voltage is modulated from low to high over the duration of each laser pulse. In FIG. 13, bias voltage over time is shown for three identical laser pulses. These three pulses go from time to $t_0$ time $t_1$, from time $t_1$ to time $t_2$, and from time $t_2$ to time $t_3$, respectively. Each pulse may begin at a low bias voltage at the start of the pulse and end at a high bias voltage at the end of each pulse. Since avalanche photo diode bias voltage is lowest at the start of each pulse and highest at the end of each pulse, a time dependence of bias voltage and therefore signal gain is established. If two identical objects are located at different distances from the LiDAR system, light energy reflected from the closer object would interact with the avalanche photo diode sooner than it would from the farther object. Light energy from the closer object may also reflect more light energy back to the LiDAR system than the object farther away and could therefore generate a stronger signal by the avalanche photo diode. Thus a controlled bias voltage sweep may result in a moderation of circuit signal gain since stronger signal generating objects are subject to lower bias voltage and lower gain while weaker signal generating objects are subject to higher bias voltage and higher gain. Though FIG. 13 represents the controlled bias voltage sweeps as being linear with time, non-linear bias voltage modulations may be used.

Figure 14:
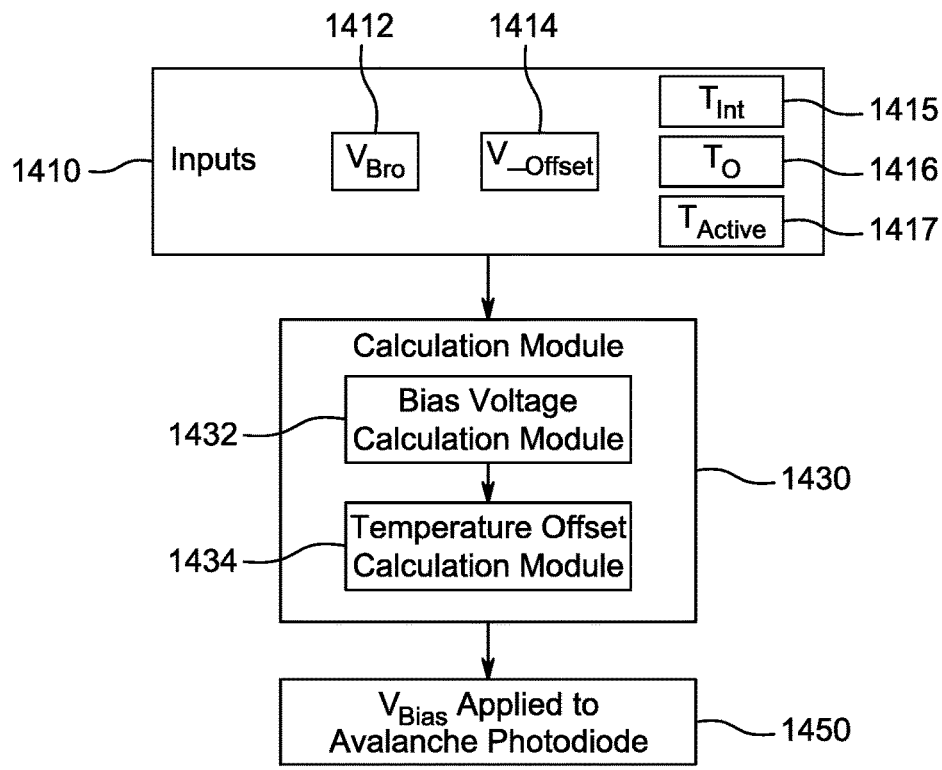
FIG. 14 shows an illustrative block diagram of temperature based bias offset system for controlling the bias voltage applied to an avalanche photo diode according to an embodiment.

FIG. 14 shows an illustrative block diagram of temperature based bias offset system 1400 for controlling the bias voltage applied to an avalanche photo diode according to an embodiment. System 1400 can include inputs 1410, calculation module 1430, and V_Bias output 1450. Inputs 1410 are provided to calculation module 1430, which generates V_Bias output 1450 to be applied to the avalanche photodiode. Inputs 1410 can include V_BR0 1412, V_Offset 1414, T_INT 1415, T_0 1416, and T_Active 1417. V_BR0 1412 represents an avalanche photodiode breakdown voltage based on an initial system calibration (e.g., when the LiDAR system is turned ON). V_BR0 1412 may be set using, for example, the voltage sweeping process of FIGS. 8 and 9 that can be used to determine the breakdown voltage of the photodiode. V_Offset 1414 represents an operating voltage offset from avalanche condition of the avalanche photodiode. The value chosen for V_Offset 1414 can be selected based on how aggressive or conservative system 1400 desires to run the avalanche photodiode. A larger V_offset corresponds to a conservative approach whereas a smaller V_Offset corresponds to an aggressive approach. The closer V_Bias operates to the breakdown voltage, the better the intensity response is from the avalanche photodiode, however, operating closer to the breakdown voltage makes the avalanche photodiode more susceptible to noise, avalanche events, and temperature induced breakdown or avalanche events. T_INT 1415 represents a temperature measurement at initial system calibration, T_0 1416 represents a temperature measurement at the beginning of a LiDAR system scanning event, and T_Active 1417 represents a temperature measurement taken during the LiDAR system scanning event. T_INT 1415, T_0 1416, and T_Active 1417 may all be obtained by the same temperature sensor (e.g., sensor 630 of FIG. 6).

Calculation module 1430 can include bias voltage calculation module 1432 and temperature offset calculation module 1434. Bias voltage calculation module 1432 can calculate an initial bias voltage V_Bias0 that is fed as an input to temperature offset calculation module 1434. V_Bias0 can represent the bias voltage at the start of LiDAR scanning event. For certain APD devices, V_Bias0 can be calculated approximately using a simplified equation (1) below:

$$V\_Bias0 = V\_BR0 * S + E - V\_Offset \quad (1),$$

where V_BR0 is the avalanche photodiode breakdown voltage based on an initial system calibration, S and E are fit constants representing a linear relationship between the breakdown voltage and the avalanche voltage threshold, and V_Offset is the operating voltage offset from the avalanche voltage threshold. The product of V_BR0 and S produces the anticipated avalanche threshold, which can represent an inflection point within the photodiode where system 1400 expects the noise to be too problematic for data processing even though the photodiode has not reached full avalanche breakdown. The operating voltage offset V_Offset allows the LiDAR system to be operated at a fixed level below the anticipated avalanche threshold, where the system noise is more manageable.

Temperature offset calculation module 1434 can calculate the temperature offset bias voltage, V_Bias, that is applied to avalanche photo diode as output 1450. V_Bias can represent bias voltage applied to the avalanche photo diode during the LiDAR scanning event. The temperature offset bias voltage, V_Bias can be calculated based on equation (2) below:

$$V\_Bias = V\_Bias0 + V\_Adj(T\_Active, T0) \qquad (2),$$

where V_Bias0 is the initial bias voltage, T_Active is the temperature during the LiDAR scanning event, T0 is the temperature at the beginning of the LiDAR scanning event, and V_Adj (T_Active, T0) is the temperature compensation function for APD bias voltage. Module 1434 takes the temperature into account when determining the bias voltage to be applied to the avalanche photodiode.

Figure 15:
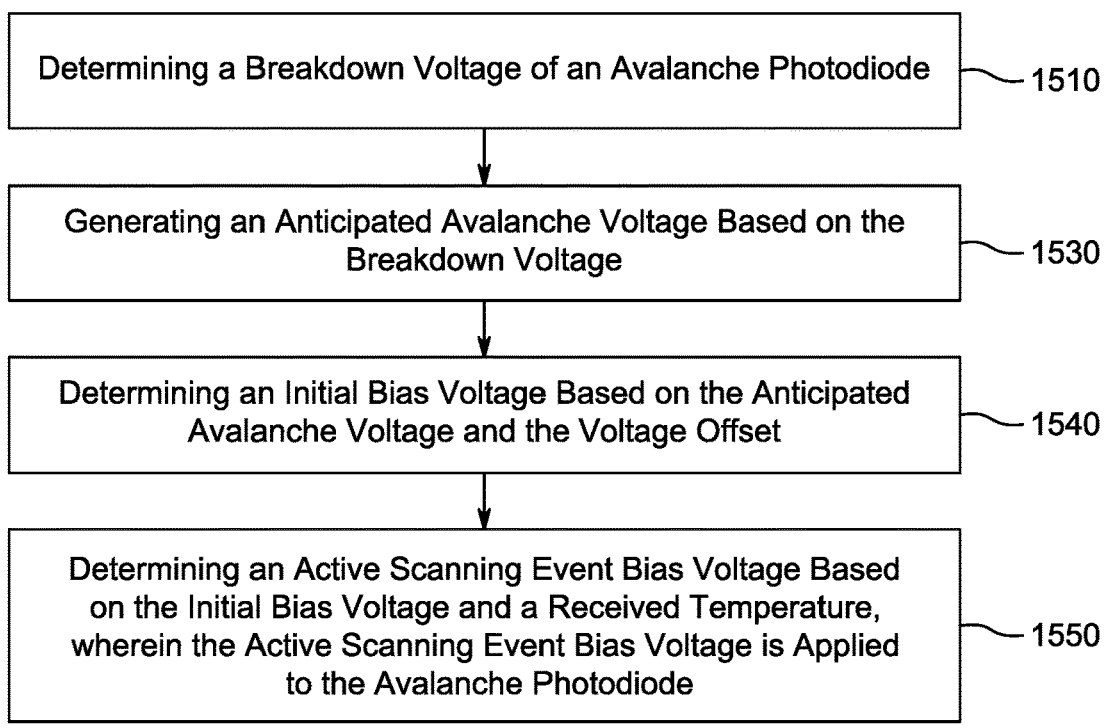
FIG. 15 shows an illustrative process for using the equations of FIG. 14 according to an embodiment.

FIG. 15 shows an illustrative process for using the equations of FIG. 14 according to an embodiment. The process in FIG. 15 can be implemented in a LiDAR system including an avalanche photo diode (APD), a temperature sensor, and a variable voltage source. Starting at step 1510, a breakdown voltage of the APD can be determined. The breakdown voltage can be determined by performing a voltage sweep of the APD to determine a voltage level where the APD experiences a breakdown event, and selecting the voltage level as the breakdown voltage.

At step 1530, an anticipated avalanche voltage threshold can be generated based on the breakdown voltage. The anticipated avalanche voltage threshold can represent an inflection point within the APD where the LiDAR system expects noise generated by the APD to be too problematic for data processing even though the APD has not reached full avalanche breakdown.

At step 1540, an initial bias voltage can be determined based on the anticipated avalanche voltage threshold and a voltage offset. The voltage offset can set the initial bias voltage to a voltage level that is lower than the anticipated avalanche voltage threshold. The initial bias voltage can be determined using equation 1 above. At step 1550, an active scanning event bias voltage can be determined based on the initial bias voltage and a temperature received by the temperature sensor, wherein the active scanning event bias voltage is applied to the avalanche photodiode by the variable voltage source to prevent the avalanche photodiode from operating at or above the anticipated avalanche voltage. The active scanning event bias voltage can be determined using equation 2 above.

It should be understood that the steps shown in FIG. 15 are merely illustrative and that additional steps may be added, or omitted.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-15, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method for setting a bias voltage for operating an avalanche photo diode (APD) used in a light detection and ranging (LiDAR) system, the method comprising:
   obtaining a physical breakdown voltage of the APD, a variable voltage offset, a first temperature, and a second temperature different from the first temperature;
   determining an anticipated avalanche voltage threshold based on the physical breakdown voltage of the APD, wherein the anticipated avalanche voltage threshold being different from the physical breakdown voltage of the APD;

determining, based on expected noise generated by the APD and a temperature difference between the second temperature and the first temperature, a bias voltage of the APD at the second temperature using the anticipated avalanche voltage threshold and the variable voltage offset; and causing the bias voltage of the APD at the second temperature to be applied to the APD by a controlled voltage source such that the APD does not operate at or above the anticipated avalanche voltage threshold.

2. The method of claim 1, wherein the anticipated avalanche voltage threshold represents an inflection point within the APD, the inflection point being associated with the expected noise generated by the APD.

3. The method of claim 1, wherein determining the anticipated avalanche voltage threshold based on the physical breakdown voltage of the APD comprises:
calculating a product of the physical breakdown voltage of the APD and a first fit constant; and
calculating the anticipated avalanche voltage threshold based on a second fit constant and the product of the physical breakdown voltage of the APD and the first fit constant.

4. The method of claim 1, wherein determining the bias voltage of the APD at the second temperature based on the anticipated avalanche voltage threshold, the variable voltage offset, the first temperature, and the second temperature comprises:
determining an initial bias voltage based on the anticipated avalanche voltage threshold and the variable voltage offset, wherein the initial bias voltage of the APD represents a voltage applied to the APD at the first temperature corresponding to a beginning of an active LiDAR scanning event; and
determining the bias voltage of the APD at the second temperature based on the initial bias voltage and a temperature compensation according to the difference of the second temperature and the first temperature.

5. The method of claim 4, wherein the variable voltage offset sets the initial bias voltage of the APD to a voltage level that is lower than the anticipated avalanche voltage threshold.

6. The method of claim 5, wherein the bias voltage of the APD is applied to the APD operating at the second temperature during the active LiDAR scanning event.

7. The method of claim 1, wherein determining the bias voltage of the APD at the second temperature comprises determining a first adjusted voltage based on a temperature compensation function according to the difference of the second temperature and the first temperature; and
wherein causing the determined bias voltage of the APD at the second temperature to be applied to the APD comprises applying at least the first adjusted voltage to operate the APD.

8. The method of claim 7, further comprising:
determining a second adjusted voltage based on the anticipated avalanche voltage threshold and the variable voltage offset; and
applying the second adjusted voltage to operate the APD.

9. The method of claim 1, wherein obtaining the physical breakdown voltage of the APD comprises:
obtaining a relation of signal intensity versus voltage to determine a voltage level where a signal gain approaches infinity; and
selecting the voltage level as the physical breakdown voltage.

10. The method of claim 1, wherein obtaining the physical breakdown voltage of the APD comprises:
performing a voltage sweep of the APD to determine a voltage level where the APD experiences a breakdown event; and
selecting the voltage level as the physical breakdown voltage.

11. A light detection and ranging (LiDAR) system, comprising an avalanche photo diode (APD), a voltage source, and a controller coupled to the voltage source, the controller being configured to perform:
obtaining a physical breakdown voltage of the APD, a variable voltage offset, a first temperature, and a second temperature different from the first temperature;
determining an anticipated avalanche voltage threshold based on the physical breakdown voltage of the APD, wherein the anticipated avalanche voltage threshold being different from the physical breakdown voltage of the APD;
determining, based on expected noise generated by the APD and a temperature difference between the second temperature and the first temperature, a bias voltage of the APD at the second temperature using the anticipated avalanche voltage threshold and the variable voltage offset; and
causing the bias voltage of the APD at the second temperature to be applied to the APD by a controlled voltage source such that the APD does not operate at or above the anticipated avalanche voltage threshold.

12. The system of claim 11, wherein the anticipated avalanche voltage threshold represents an inflection point within the APD, the inflection point being associated with the expected noise generated by the APD.

13. The system of claim 11, wherein determining the anticipated avalanche voltage threshold based on the physical breakdown voltage of the APD comprises:
calculating a product of the physical breakdown voltage of the APD and a first fit constant; and
calculating the anticipated avalanche voltage threshold based on a second fit constant and the product of the physical breakdown voltage of the APD and the first fit constant.

14. The system of claim 11, wherein determining the bias voltage of the APD at the second temperature based on the anticipated avalanche voltage threshold, the variable voltage offset, the first temperature, and the second temperature comprises:
determining an initial bias voltage based on the anticipated avalanche voltage threshold and the variable voltage offset, wherein the initial bias voltage of the APD represents a voltage applied to the APD at the first temperature corresponding to a beginning of an active LiDAR scanning event; and
determining the bias voltage of the APD at the second temperature based on the initial bias voltage and a temperature compensation according to the difference of the second temperature and the first temperature.

15. The system of claim 14, wherein the variable voltage offset sets the initial bias voltage of the APD to a voltage level that is lower than the anticipated avalanche voltage threshold.

16. The system of claim 15, wherein the bias voltage of the APD is applied to the APD operating at the second temperature during the active LiDAR scanning event.

17. The system of claim 11, wherein determining the bias voltage of the APD at the second temperature comprises determining a first adjusted voltage based on a temperature compensation function according to the difference of the second temperature and the first temperature; and
  wherein causing the determined bias voltage of the APD at the second temperature to be applied to the APD comprises applying at least the first adjusted voltage to operate the APD.

18. The system of claim 17, further comprising:
  determining a second adjusted voltage based on the anticipated avalanche voltage threshold and the variable voltage offset; and
  applying the second adjusted voltage to operate the APD.

19. The system of claim 11, wherein obtaining the physical breakdown voltage of the APD comprises:
  obtaining a relation of signal intensity versus voltage to determine a voltage level where a signal gain approaches infinity; and
  selecting the voltage level as the physical breakdown voltage.

20. The system of claim 11, wherein obtaining the physical breakdown voltage of the APD comprises:
  performing a voltage sweep of the APD to determine a voltage level where the APD experiences a breakdown event; and
  selecting the voltage level as the physical breakdown voltage.

21. A non-transitory computer readable medium storing one or more programs, the one or more programs comprising instructions, which when executed by a controller of a light detection and ranging (LiDAR) system comprising an avalanche photo diode (APD), a voltage source, and a controller coupled to the voltage source, cause the controller to perform a method of:
  obtaining a physical breakdown voltage of the APD, a variable voltage offset, a first temperature, and a second temperature different from the first temperature;
  determining an anticipated avalanche voltage threshold based on the physical breakdown voltage of the APD, wherein the anticipated avalanche voltage threshold being different from the physical breakdown voltage of the APD;
  determining, based on expected noise generated by the APD and a temperature difference between the second temperature and the first temperature, a bias voltage of the APD at the second temperature using the anticipated avalanche voltage threshold and the variable voltage offset; and
  causing the bias voltage of the APD at the second temperature to be applied to the APD by a controlled voltage source such that the APD does not operate at or above the anticipated avalanche voltage threshold.

* * * * *